United States Patent
Ellis et al.

(10) Patent No.: US 10,783,119 B2
(45) Date of Patent: Sep. 22, 2020

(54) FIXED RECORD MEDIA CONVERSION WITH DATA COMPRESSION AND ENCRYPTION

(71) Applicant: Seagate Technology LLC, Cupertino, CA (US)

(72) Inventors: Jackson Ellis, Fort Collins, CO (US); Jeffrey Munsil, Fort Collins, CO (US); Carl Forhan, Rochester, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 472 days.

(21) Appl. No.: 15/671,469

(22) Filed: Aug. 8, 2017

(65) Prior Publication Data
US 2019/0050417 A1    Feb. 14, 2019

(51) Int. Cl.
*G06F 17/00*    (2019.01)
*G06F 16/174*   (2019.01)
*G06F 3/06*     (2006.01)
*G06F 21/78*    (2013.01)
*G06F 21/62*    (2013.01)

(52) U.S. Cl.
CPC ........ *G06F 16/1748* (2019.01); *G06F 3/0611* (2013.01); *G06F 3/0653* (2013.01); *G06F 21/6209* (2013.01); *G06F 21/6218* (2013.01); *G06F 21/78* (2013.01); *G06F 2201/88* (2013.01)

(58) Field of Classification Search
None
See application file for complete search history.

(56) References Cited

U.S. PATENT DOCUMENTS

| | | | |
|---|---|---|---|
| 7,529,903 B2 | 5/2009 | Boss et al. | |
| 8,280,853 B1 * | 10/2012 | Lai | G06F 16/113 707/651 |
| 8,478,731 B1 * | 7/2013 | Throop | G06F 16/1744 707/693 |
| 8,667,494 B1 * | 3/2014 | Riordan | G06F 9/5011 718/104 |
| 9,280,550 B1 | 3/2016 | Hsu et al. | |
| 9,501,426 B1 * | 11/2016 | Hendry | G06F 12/121 |
| 9,557,923 B2 | 1/2017 | Bish et al. | |
| 2001/0047461 A1 * | 11/2001 | Milillo | G06F 11/1448 711/162 |
| 2010/0077168 A1 | 3/2010 | Arakawa | |
| 2011/0167236 A1 * | 7/2011 | Orikasa | G06F 3/0608 711/165 |
| 2011/0258225 A1 * | 10/2011 | Taylor | G06F 16/2272 707/769 |
| 2014/0122778 A1 | 5/2014 | O'Brien | |
| 2018/0332366 A1 * | 11/2018 | Paduroiu | H04L 67/26 |

* cited by examiner

*Primary Examiner* — Hung D Le
(74) *Attorney, Agent, or Firm* — Westman, Champlin & Koehler, P.A.

(57) ABSTRACT

A method includes compressing input data to form compressed data and comparing a size of the compressed data to a maximum allowed size determined from a fixed sector size for a lower tier of the multi-tier storage system and a minimum pad length for a pad that is stored in the same sector as the compressed data when the compressed data is migrated to the lower tier. When the size of the compressed data is greater than the maximum allowed size, the input data is stored instead of the compressed data in an upper tier of the multi-tier storage system.

20 Claims, 5 Drawing Sheets

FIXED RECORD MEDIA CONVERSION WITH DATA COMPRESSION AND ENCRYPTION

SUMMARY

A method includes compressing input data to form compressed data and comparing a size of the compressed data to a maximum allowed size determined from a fixed sector size for a lower tier of the multi-tier storage system and a minimum pad length for a pad that is stored in the same sector as the compressed data when the compressed data is migrated to the lower tier. When the size of the compressed data is greater than the maximum allowed size, the input data is stored instead of the compressed data in an upper tier of the multi-tier storage system.

A storage subsystem includes at least one processing unit that compresses input data to form compressed data with a size that is less than a fixed sector size of a lower tier storage unit in a multi-tier storage system. The at least one processing unit also encrypts the compressed data to form encrypted data and adds a pad comprising the size of the compressed data to the encrypted data to form a data page that has a size equal to the fixed sector size of the lower tier storage unit.

In a still further embodiment, a method includes reading a data page from an upper tier of a multi-tier storage system, using a map value to determine whether the data page contains compressed data, and when the data page contains compressed data, adding a pad to the data page comprising a length of the compressed data before storing the data page and the pad in a lower tier of the multi-tier storage system.

DETAILED DESCRIPTION OF ILLUSTRATIVE EMBODIMENTS

Figure 1:
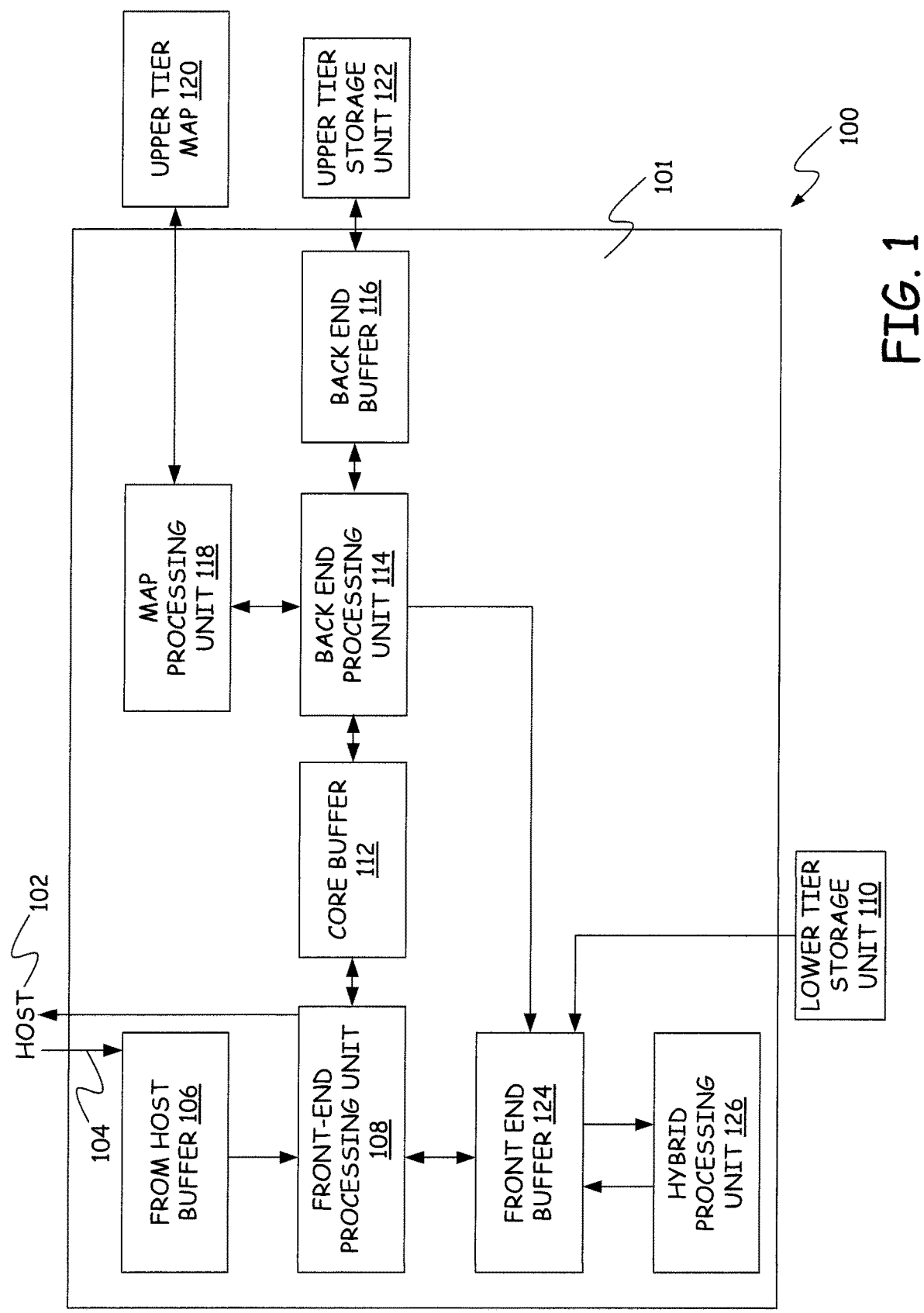
FIG. 1 is a block diagram of a multi-tier storage system in accordance with one embodiment.

In multi-tier data storage systems, data that is used often is stored in devices that allow for quick retrieval and storage but that are generally expensive while data that is not used as often is stored in devices that have slower storage and retrieval times but are generally cheaper.

When data is sent to the multi-tier system for storage, the system compresses the data and then encrypts the compressed data before storing the data. The compression reduces the data size and the encryption protects the data from unauthorized access.

Compressing the data works well for storage devices that support variable-size sectors. However, for devices that have fixed sector sizes, such as certain Hard Disk Drives, the compression can cause a problem.

First, before compression, parity bits are appended to the data so that when the data is later decompressed, the decompressed data can be parity checked to make sure the data was not altered during compression/decompression. However, if the compression did not significantly reduce the size of the data, the additional parity bits can cause the overall size of the compressed data to be larger than the fixed sector size.

Second, if compressed data and uncompressed data are stored in the same lower tier device, there is no way to tell them apart without adding a mapping table containing compression flags for each sector and the lengths of the compressed data in each sector.

As a result, if data is compressed and then encrypted before being placed in an upper tier storage device with variable size sectors, the data must be decrypted and decompressed before being migrated to the lower tier storage device so that the data will be the same size as the fixed sector size. This decryption requires the encryption key for the data, which thus requires a lower security standard where the key is available at any time so that migration can take place as needed.

The embodiments described herein overcome these problems using a combination of techniques. First, a rule is applied that will only allow data to be compressed before being encrypted if the compressed size is less than the fixed sector size of the lower tier device minus a minimum padding length. Second, a pad, which is guaranteed to have at least the minimum padding length, is appended to the compressed data after the compressed data is encrypted and before the encrypted and compressed data is stored in the lower tier storage device. This pad includes a sequence of binary values that designate it as a pad followed by a 4-byte length for the encrypted and compressed data followed by as many zeros as needed to make the pad length plus the encrypted and compressed data length equal to the fixed sector size. The sequence of binary values before the 4-byte length value is selected so that it is highly improbable that an encrypted data page would start with the same sequence. For example, the sequence can be a 12-byte sequence of all zeros in some embodiments. Since such a sequence is unlikely to occur at the beginning of an encrypted data page, this sequence can be used to identify which pages have a pad and are therefore compressed and which pages do not have a pad and are therefore not compressed. Thus, the pad allows the storage subsystem to identify which data pages read from the lower tier storage device are compressed and the length of the compressed data without requiring this information to be stored in a map for the lower tier storage device.

Using these two techniques, when compressed data is to be migrated from the upper tier to the lower tier, it does not have to be decrypted. Instead, the encrypted and compressed data is simply read from the upper tier and the pad is added to it before being written to the lower tier. This increases the security of the multi-tier data storage system because the encryption keys are not required when demoting data from the upper tier to the lower tier and speeds the movement of data between the tiers because decryption does not have to be performed during a demotion.

FIG. 1 provides a block diagram of a host 102 and a multi-tier storage system 100 including a storage subsystem 101, an upper tier storage unit 122, an upper tier map 120, and a lower tier storage unit 110, in accordance with the various embodiments. In FIG. 1, a host 102 provides a host page 104 to a from-host-buffer 106 in storage subsystem 101. Host page 104 is read from from-host-buffer 106 by a front end processing unit 108, which performs front end processing on host page 104 as depicted in a flow diagram of FIG. 2.

Figure 2:
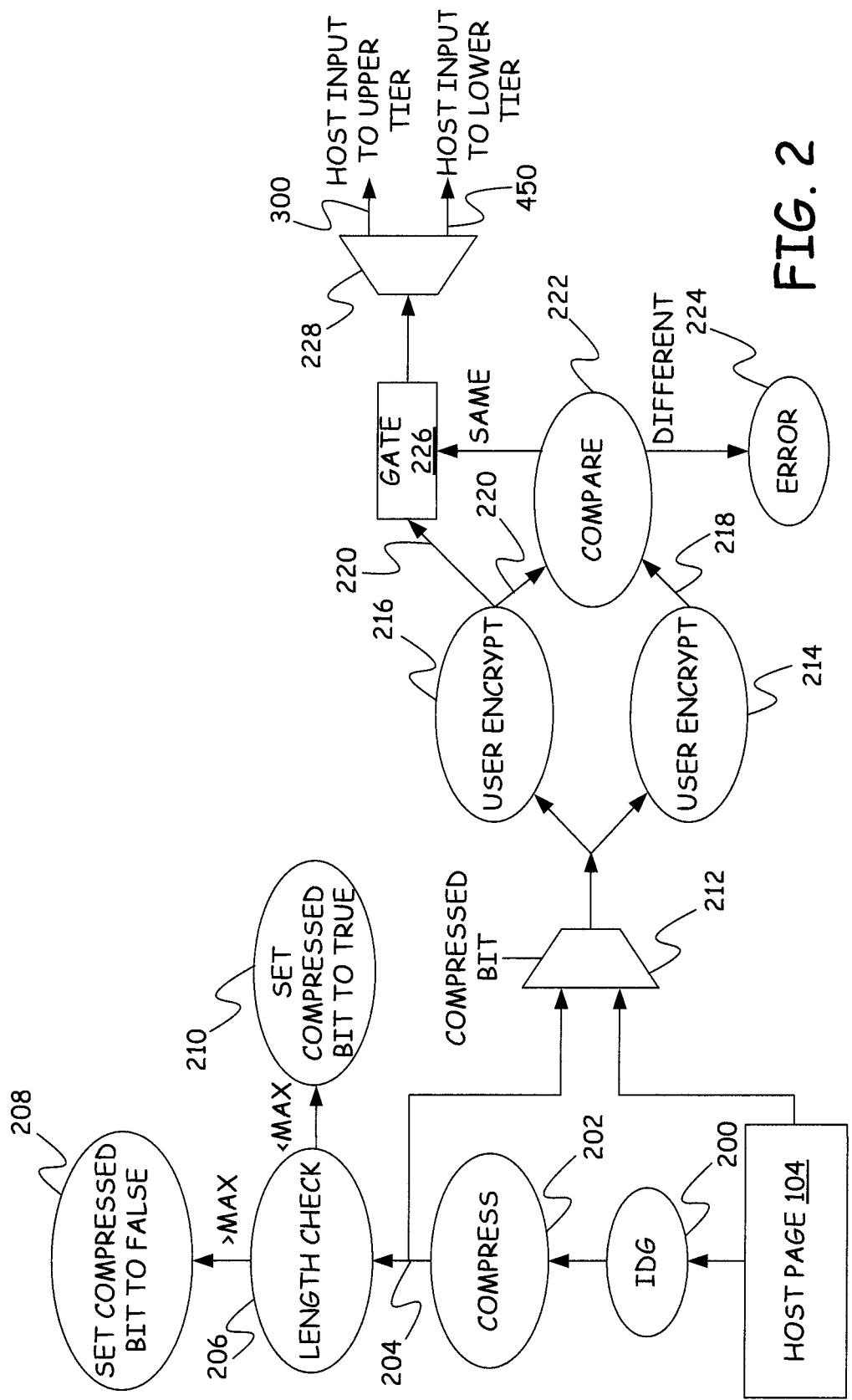
FIG. 2 is a flow diagram for preparing data from a host for storage in a multi-tier storage system in accordance with one embodiment.

In FIG. 2, host page 104 is initially processed at step 200 to generate an inner error detection code that is appended to host page 104. The inner error detection code is a sequence of binary values that can validate whether the combination of host page 104 and the inner error detection code have changed during processing as discussed further below. In accordance with some embodiments, the inner error detection code is replaced with an inner error correction code that has error correction features that allow errors of less than a maximum size to be detected and corrected.

After the inner error detection code has been appended to host page 104, the combination of the host page and the error detection code are compressed at step 202 to form a compressed data page 204. At step 206, the length of compressed data page 204 is checked and is compared against a maximum allowed length for compressed files. In accordance with one embodiment, this maximum length is equal to the fixed sector length of a lower tier storage unit 110 of FIG. 1 minus a minimum pad length for a pad that will later be added to the compressed data page before storage in lower tier storage unit 110. If the length of compressed data page 204 is greater than this maximum allowed length, the compressed data page cannot be used and a compressed bit is set to false at step 208. If the length of compressed data page 204 is less than the maximum allowed length, the compressed data page can be used and the compressed bit is set to true at step 210.

At step 212, the value of the compressed bit is used to select either host page 104 or compressed data page 204. If the compressed bit is set to true, the compressed data page 204 is selected and if the compressed bit is set to false, the host page 104 is selected.

The selected page is provided to two user encryptions 214 and 216, which are designed to provide the same encryption. The user encryptions 214 and 216 produce respective encrypted pages 218 and 220, which are compared to each other at step 222. If encrypted pages 218 and 220 are different from each other, an error has occurred in one or both of user encryptions 214 and 216 resulting in an error 224. In accordance with one embodiment, in response to error 224, storage subsystem 101 attempts to re-encrypt the data page selected at step 212 using user encryptions 214 and 216.

If encrypted pages 218 and 220 are determined to be the same at step 222, encrypted page 220 is allowed to pass through a gate 226 and is sent either a processing unit for the upper tier storage device (path 300) or to a processing unit for the lower tier storage device (path 450) at step 228.

Thus, in the method shown in FIG. 2, a host page is compressed if the compressed size of the host page can be made sufficiently small and then is encrypted before being sent for storage in the upper tier storage unit or the lower tier storage unit.

Figure 3:
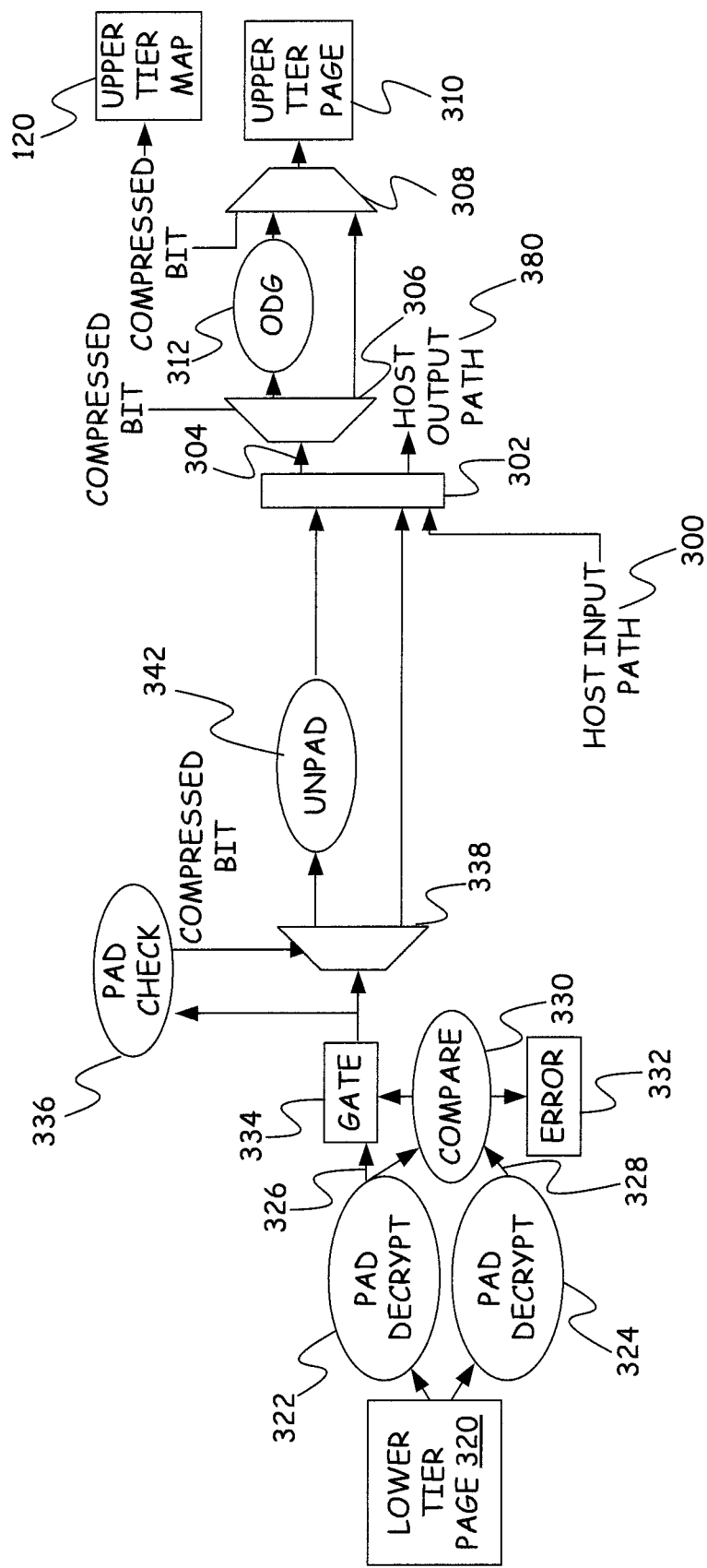
FIG. 3 is a flow diagram for writing data to an upper tier storage device of a multi-tier storage system in accordance with one embodiment.

If the encrypted page is sent to the processing unit for the upper tier storage device at step 228, front end processing unit 108 stores the page in a core buffer 112. The encrypted page is then read from core buffer 112 by back end processing unit 114. This movement of the page from front end processing unit 108 to back end processing unit 114 is shown in FIGS. 2 and 3 as steps 228 and 302 and path 304. Encrypted pages from the host along path 304 are processed by back end processing unit 114 by first determining if the encrypted page contains compressed data at step 306 of FIG. 3. This determination is made based on the setting of the compressed bit. If the encrypted page does not include compressed data, the encrypted page is selected as upper tier page 310 at step 308 and is stored in back end buffer 116. A map processing unit 118 then uses the value of the compressed bit to set a flag in upper tier map 120 indicating that upper tier page 310 contains compressed data.

When the page on path 304 does not contain compressed data, back end processing unit 114 generates an outer error detection code at step 312 that is appended to the encrypted data to form upper tier page 310. This outer error detection code can be used to validate that neither the encrypted page nor the outer error detection code has changed during read back of the data from upper tier storage unit 122 as discussed further below. In accordance with some embodiments, the outer error detection code can be an outer error correction code that can be used to identify where errors have been introduced into the encrypted data and/or outer error correction code and allow those errors to be corrected. After the encrypted data with the appended outer error detection code has been stored in back end buffer 116 as upper tier page 310, map processing unit 118 sets a flag in upper tier map 120 indicating that upper tier page 310 does not contain compressed data.

Upper tier page 310 is then read from back end buffer 116 and is stored in upper tier storage unit 122.

Examples of upper tier storage unit 122 in accordance with some embodiments include storage devices that support variable-size data pages, such as Solid State Drives (SSDs) also known as flash drives. Such upper tier storage units have fast access times but are generally more expensive on a price per megabit basis than lower tier storage unit 110, which in accordance with some embodiments is a hard disk drive having a fixed sector length.

To optimize the usage of upper tier storage unit 122, storage subsystem 101 demotes data from upper tier storage unit 122 to lower tier storage unit 110 when the data is no longer being accessed on a regular basis. During the demotion, an upper tier page 400 is read from upper tier storage unit 122 and stored in back end buffer 116. Back end processing unit 114 then reads upper tier page 400 from back end buffer 116 while map processing unit 118 reads the corresponding map flags from upper tier map 120 for upper tier page 400. In particular, map processing unit 118 uses the map flags to set the compressed bit to indicate whether upper tier page 400 contains compressed data.

Figure 4:
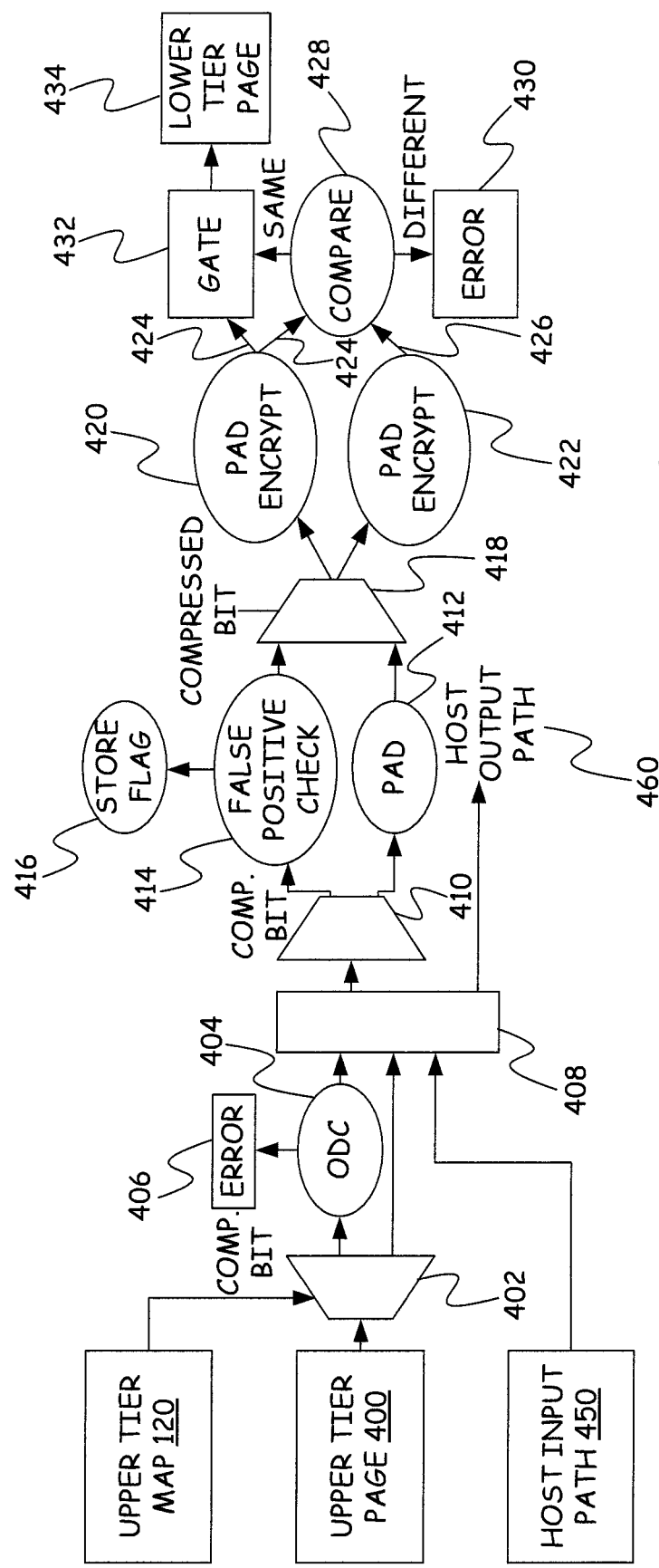
FIG. 4 is a flow diagram for writing data to a lower tier storage device of a multi-tier storage system in accordance with one embodiment.

Back end processing unit 114 then performs steps shown in the flow diagram of FIG. 4 beginning at step 402 where back end processing unit 114 determines if upper tier page 400 contains compressed data. If upper tier page 400 does not contain compressed data at step 402, upper tier page 400 is provided to an outer error detection code check 404, which performs an outer error detection code check based on the outer error detection code appended to the encrypted data in upper tier page 400 at step 312 of FIG. 3. If the outer error detection code check 404 indicates that the encrypted data or the outer error detection code has been altered since being stored on upper tier storage unit 122, back end processing unit 114 indicates an error 406. Within this error state, back end processing unit 114 triggers a re-read of upper tier page 400 from upper tier storage unit 122. In accordance with embodiments where an outer error correction code is used in place of the outer error detection code, back end processing unit 114 attempts to first correct the error in the encrypted data if the error is small enough that the outer error correction code allows for such correction. If the error is too large to be corrected using the outer error correction code, back end processing unit 114 triggers a re-read of upper tier page 400 from upper tier storage unit 122.

If the encrypted data does not contain any errors or after errors in the encrypted data have been corrected using the outer error correction code, outer error detection code check 404 passes the encrypted data without the outer error detection code to path control 408. If upper tier page 400 contains compressed data at step 402, upper tier page 400 is passed directly to path control 408 after step 402.

Path control 408 can direct the encrypted page either to lower tier storage unit 110 or to host 102. When the encrypted data is to be demoted to lower tier storage unit 110, back end processing unit 114 writes the encrypted data to front end buffer 124, which is then read by a hybrid processing unit 126 of FIG. 1.

At step 410, hybrid processing unit 126 determines whether the value in front end buffer 124 is compressed using the value of the compressed bit, which was set during the readout of upper tier map 120. If the encrypted page read from front end buffer 124 contains compressed data, hybrid processing unit 126 adds a pad to the compressed data at step 412. In accordance with one embodiment, this pad is formed by first determining the length of upper tier page 400 and representing that length by a 4-byte binary value. Since upper tier page 400 is an encrypted and compressed page at step 412, determining the length of upper tier page 400 involves determining a length of an encrypted and compressed page. A pad designation sequence is then prepended to the length to form a minimum length pad. The pad designation sequence is a sequence of binary values that distinguish the pad from encrypted pages that do not contain a pad. In particular, the sequence of binary values is selected such that it is highly improbable than an encrypted page will contain that sequence. For example, a sequence of twelve bytes of zeros or twelve bytes of ones can be used since encrypted pages are less likely to contain such sequences. In other embodiments, other sequences may be selected based on the type of encryption used by selecting sequences that the particular encryption is unlikely to generate regardless of the data input to the encryption. The remainder of the pad is formed by appending a sequence of binary values so that the length of the pad is equal to the fixed sector size of the lower tier storage unit 110 minus the size of the encrypted and compressed data received by hybrid processing unit 126 at step 412. In accordance with one embodiment, the appended sequence of binary values is all zeros. This pad is then prepended to the encrypted and compressed data of upper tier page 400 forming a data page that has a length equal to the fixed sector length of lower tier storage unit 110.

If the encrypted data read by hybrid processing unit 126 is not compressed at step 410, hybrid processing unit 126 does a false positive check at step 414 to determine if the encrypted data appears to contain pad data. As noted above, the prepended sequence of binary values in the pad is selected because it is unlikely that the encryption will form that sequence when forming encrypted data. However, it is still possible for the encryption to form the pad sequence. In false positive check 414, hybrid processing unit 126 examines the four bytes after the sequence of binary values that match the pad designation sequence to retrieve a length. False positive check 414 then examines the bits after the 4-byte length to determine the end of the false pad. For example, if the pad is formed by appending all zeros after the 4-byte length, false positive check 414 looks for the first one after the 4-byte length and considers that to be the start of the false data. False positive check 414 then determines the length of the false data by determining the length from the start of the false data to the end of the false data. This length is then be compared to the 4-byte length value read from the pad. If the lengths match, the data represents a false positive in that the pad appears to indicate that it contains compressed data when it actually does not. As a result, a flag indicating the false positive condition is stored for the data page at step 416. In accordance with one embodiment, the false positive check can be performed twice to ensure that the false positive condition has been properly identified. After false positive check 414, the encrypted data is applied to step 418 without modification.

At step 418, hybrid processing unit 126 uses the value of the compressed bit to select the compressed data with pad from pad step 412 or the encrypted data from false positive check 414 to provide to two pad encryptions 420 and 422. Pad encryptions 420 and 422 perform the same encryption as each other to provide respective pad encrypted pages 424 and 426. At step 428, pad encrypted pages 424 and 426 are compared to each other. If pad encrypted pages 424 and 426 are different from each other, there is an error 430, which causes pad encryptions 420 and 422 to be repeated. If pad encrypted pages 424 and 426 are the same, pad encrypted page 424 passes through a gate 432 to become lower tier page 434, which hybrid processing unit 126 writes to front end buffer 124 to then be read into lower tier storage unit 110 as part of storing lower tier page 434 in lower tier storage unit 110.

Looking at the demotion of upper tier page 400 to lower tier page 434, it can be seen that the user encryption 216 applied to the compressed data in FIG. 2 is not decrypted during the demotion. Further, the compressed data is not decompressed before being stored in lower tier page 434. As a result, multi-tier storage device 100 is more secure than prior art devices since the encryption keys are not required during demotion and the data remains encrypted and compressed in lower tier page 434 on lower tier storage unit 110.

In addition to the demotion discussed above, FIG. 4 also shows a direct path for writing a host page to lower tier storage unit 110. In particular, host input to lower tier path 450 created by path control 228 of FIG. 2 is shown to enter path control 408. Path controls 228 and 408 are implemented by front end processing unit 108 storing the encrypted and possibly compressed host page 104 to front end buffer 124 and having hybrid processing unit 126 retrieve the encrypted and possibly compressed page and performing steps 410 through 432 on the retrieved page. In such direct host 102 to lower tier storage unit 110 writes, the compressed bit is set in steps 208 and 210 of FIG. 2. Thus, host pages that have been compressed will include a pad through step 412 and host pages that represent a false positive for a pad but are in fact not compressed as determined in step 414, will have a false positive flag stored for them at step 416.

Storage subsystem 101 is also able to promote data stored in lower tier storage unit 110 to upper tier storage unit 122 if the frequency of access of the data increases. FIG. 3 shows the steps of promoting such a lower tier page 320. Initially, lower tier page 320 is written by lower tier storage unit 110 to front end buffer 124, which is then read by hybrid processing unit 126. Lower tier page 320 is then pad decrypted at steps 322 and 324, which each perform the same pad decryption. This pad decryption is the inverse of pad encryptions 420 and 422. Pad decryptions 322 and 324 form pad decrypted pages 326 and 328, which are compared at step 330. Since pad decryptions 322 and 324 are identical, pad decrypted pages 326 and 328 should be identical unless an error occurred during one or both of the pad decryptions.

If pad decrypted pages 326 and 328 are not identical, an error state is created at step 332 and pad decryptions 322 and 324 are repeated. If pad decrypted pages 326 and 328 are the same, pad decrypted page 326 passes through a gate 334 and is applied to a pad check 336.

During pad check 336, hybrid processing unit 126 examines the initial portion of the pad decrypted page to determine if it includes the pad designation sequence of binary values. If the pad decrypted page includes the pad designation, the next four bytes after the pad designation are retrieved and are used to identify the length of the data that follows the pad. Hybrid processing unit 126 then examines the bits after the 4-byte length to determine the end of the pad. For example, if the pad is formed by appending all zeros after the 4-byte length, hybrid processing unit 126 looks for the first one after the 4-byte length and considers that to be the start of the data. Hybrid processing unit 126 then determines the length of the data by determining the length from the start of the data to the end of the data. This length is then compared to the 4-byte length value read from the pad. If the lengths match, hybrid processing unit 126 retrieves the false positive flags and determines if this data page has been designated as a false positive page. If the data page has not been designated as a false positive page and the lengths match, the data page contains an authentic pad and therefore contains compressed data. As a result, hybrid processing unit 126 sets the compressed bit to true. If the lengths do not match or the false positive flags indicate that this is a false positive page, the data page does not contain compressed data and hybrid processing unit 126 sets the compressed bit to false.

At step 338, hybrid processing unit 126 uses the compressed bit to determine whether to perform an unpad step 342. If the compressed bit is true, the pad decrypted data page 326 contains a pad followed by encrypted and compressed data and the pad is removed by unpad step 342. In particular, unpad step 342 uses the 4-byte length in the pad to identify the boundary between the pad and the encrypted and compressed data and then removes the pad from the encrypted and compressed data. If the compressed bit is false, decrypted data page 326 does not contain a pad and unpad step 342 is not performed.

After unpad step 132 or if unpad step 132 is not performed, hybrid processing unit 126 writes the data page to front end buffer 124. If the data page is to be written to the upper tier storage unit 122, path control 302 causes back end processing unit 114 to read the value from front end buffer 124 and to perform steps 306, 308 and 312 to form upper tier page 310 and upper tier map 120 as discussed further above.

As shown above, during promotion, lower tier page 320 does not need to be decrypted and decompressed before being re-encrypted for storage in upper tier storage unit 122. However, in other embodiments, hybrid processing unit 126 will perform a user decryption step as the inverse of user encryption 216 and will decompress the data and perform an inner correction code check to form clear text data that is then written to front end buffer 124. This clear text data is then read from front end buffer 124 by back end processing unit 114, which then adds an inner error detection code, recompresses the data and the inner error detection code, and re-encrypts the compressed data before storing the data in back end buffer 116 for storage in upper tier storage unit 122.

Path control 302 can alternatively direct the encrypted and possibly compressed page from lower tier storage unit 110 to host 102 using a host output path 380. Similarly, path control 408 can output the encrypted and possibly compressed data from upper tier storage unit 122 to host 102 using a host output path 460 of FIG. 4. Path 380 involves hybrid processing unit 126 writing the encrypted data to front end buffer 124 and front end processing unit 108 reading the encrypted data from front end buffer 124. Path 460 involves back end processing unit 114 writing the encrypted data to core buffer 112. Front end processing unit 108 then reads the encrypted data from core buffer 112.

Figure 5:
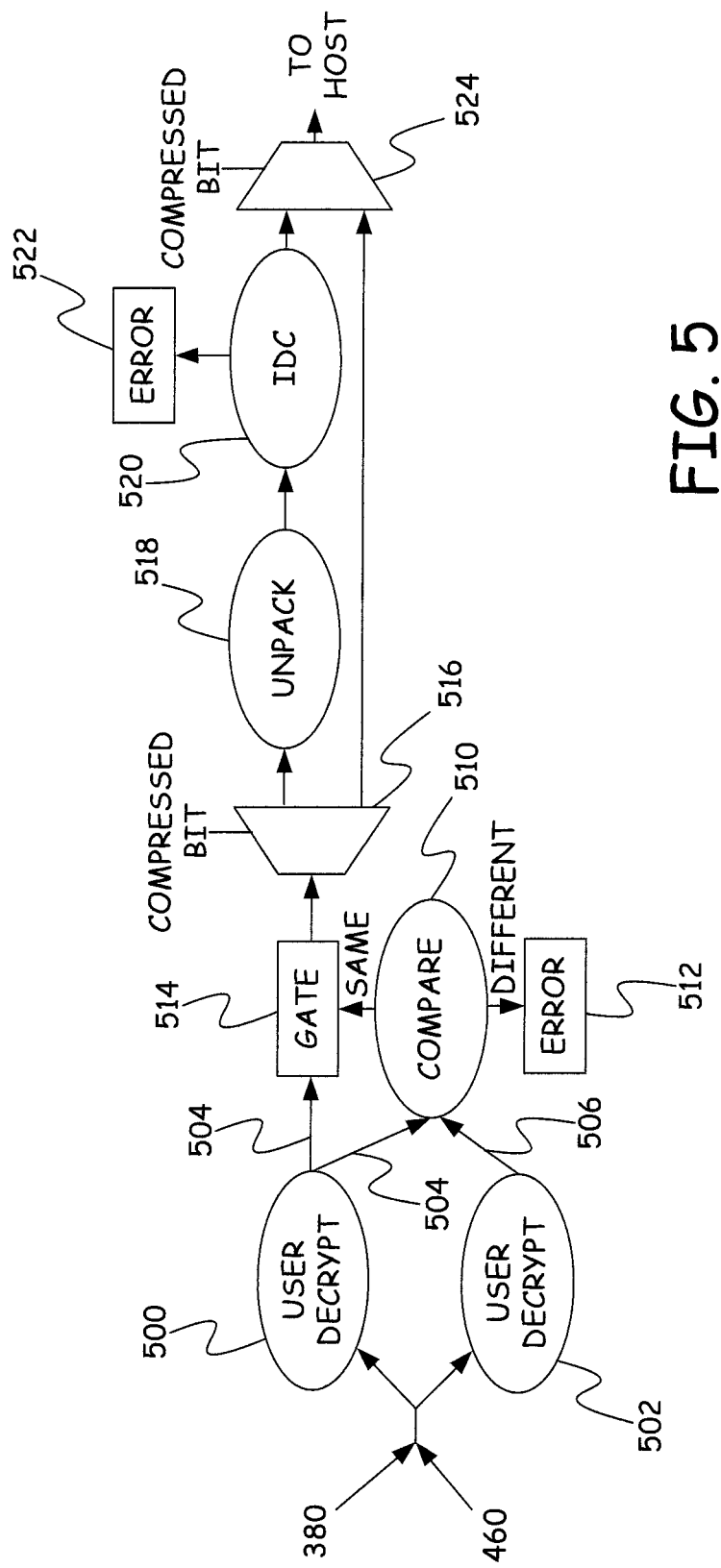
FIG. 5 is a flow diagram for recovering data from a multi-tier storage system for delivery to a host in accordance with one embodiment.

FIG. 5 shows a method used by front end processing unit 108 to decrypt and if necessary decompress (unpack) the encrypted data read from front end buffer 124 or core buffer 112 as represented by host output paths 380 and 460. At steps 500 and 502, the received encrypted page is user decrypted by performing the inverse of user encryption 216 of FIG. 2. User decryptions 500 and 502 are identical to each other and produce decrypted pages 504 and 506, respectively, which are compared to each other at step 510. If decrypted pages 504 and 506 are different from each other, an error is generated at step 512 causing the decryption to be repeated. If decrypted pages 504 and 506 are the same, decrypted page 504 passes through a gate 514. If the decrypted data contains compressed data at step 516 as indicated by the value of the compressed bit, the data is sent to be unpacked or decompressed at step 518. The indication of whether the data is compressed is based on the value of the compressed bit, which is set by pad check 336 for data read from lower tier storage unit 110 and by the value read from upper tier map 120 for data read from upper tier storage unit 122.

After the data has been decompressed at step 518, the inner error detection code is evaluated at step 520 to determine if the data or the inner error detection code has been altered since being formed by front end processing unit 108 at step 200 of FIG. 2. If the data or the inner error detection code has been altered, an error 522 occurs, which causes the data to be decompressed again. In accordance with embodiments that use an inner error correction code instead of the inner error detection code, error 522 causes the data to be corrected if the error in the data is small enough to be corrected by the inner error correction code or causes the data to be decompressed again. If the inner error detection code 520 indicates that the data has not been changed or if the inner error correction code can be used to correct the data, the data is selected for output at step 524 and is written to the host 102. If the compressed bit indicates that the data does not include compressed data at step 516, the data is in clear text and is selected at step 524 to be provided to host 102.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the multi-tier storage system while maintaining substantially the same functionality without departing from the scope and spirit of the present invention. In addition, although the preferred embodiment described herein is directed to a multi-tier storage system for storing data, it will be appreciated by those skilled in the art that the teachings of the present invention can be applied to other data transfers, without departing from the scope and spirit of the present invention.

What is claimed is:

1. A method comprising:
compressing input data to form compressed data;
comparing a size of the compressed data to a maximum allowed size determined from a fixed sector size for a lower tier of the multi-tier storage system and a minimum pad length for a pad that is stored in the same sector as the compressed data when the compressed data is migrated to the lower tier; and
when the size of the compressed data is greater than the maximum allowed size, storing the input data instead of the compressed data in an upper tier of the multi-tier storage system.

2. The method of claim 1 wherein storing the input data comprises encrypting the input data to form encrypted data and storing the encrypted data.

3. The method of claim 2 wherein storing the encrypted data further comprises adding an outer error detection code to the encrypted data and storing the combination of the outer error detection code and the encrypted data in the upper tier of the multi-tier storage system.

4. The method of claim 3 further comprising reading the combination of the outer error detection code and the encrypted data from the upper tier of the multi-tier storage system, removing the outer error detection code, and storing the encrypted data in the lower tier of the multi-tier storage system.

5. The method of claim 4 further comprising examining the encrypted data to determine if a section of the encrypted data matches a pad designation sequence used to determine that encrypted and compressed data contains compressed data and when the section of the encrypted data matches the pad designation sequence storing a false positive flag for the encrypted data.

6. The method of claim 1 further comprising, when the size of the compressed data is less than or equal to the maximum allowed size, storing the compressed data in the upper tier of the multi-tier storage system.

7. The method of claim 6 wherein storing the compressed data comprises encrypting the compressed data to form encrypted and compressed data and storing the encrypted and compressed data.

8. The method of claim 7 further comprising reading the encrypted and compressed data from the upper tier of the multi-tier storage system, adding a pad to the encrypted and compressed data, and storing the combination of the pad and the encrypted and compressed data in the lower tier of the multi-tier storage system.

9. The method of claim 8 further comprising reading the encrypted and compressed data from the lower tier of the multi-tier storage system and using the pad to determine that the encrypted and compressed data is compressed.

10. A storage subsystem comprising:
at least one processing unit that compresses input data to form compressed data, that stores the input data instead of the compressed data in an upper tier storage unit of a multi-tier storage system when a size of the compressed data is greater than a maximum allowed size and otherwise stores the compressed data in the upper tier storage unit, that encrypts the compressed data to form encrypted data and that adds a pad comprising the size of the compressed data to the encrypted data to form a data page that has a size equal to a fixed sector size of a lower tier storage unit of the multi-tier storage system.

11. The storage subsystem of claim 10 wherein the at least one processing unit further pad encrypts the data page to form pad encrypted data and stores the pad encrypted data in the lower tier storage unit.

12. The storage subsystem of claim 10 wherein the at least one processing unit further reads the pad encrypted data from the lower tier storage unit, pad decrypts the pad encrypted data to obtain the pad and encrypted and compressed data, and uses the pad to determine that the encrypted data comprises encrypted and compressed data.

13. The storage subsystem of claim 10 wherein the at least one processing unit further writes the encrypted and compressed data to the upper tier of the multi-tier storage device.

14. The storage subsystem of claim 13 wherein the input data comprises an input data page and an inner error detection code.

15. A method comprising:
compressing input data to form compressed data;
comparing a size of the compressed data to a maximum allowed size determined from a fixed sector size for a lower tier of the multi-tier storage system and a minimum pad length for a pad that is stored in the same sector as the compressed data when the compressed data is migrated to the lower tier; and
performing one of:
when the size of the compressed data is greater than the maximum allowed size, storing the input data instead of the compressed data in an upper tier of the multi-tier storage system; and
when the size of the compressed data is less than or equal to the maximum allowed size, storing the compressed data in the upper tier of the multi-tier storage system.

16. The method of claim 15 wherein storing the input data comprises encrypting the input data to form encrypted data, adding an outer error detection code to the encrypted data and storing the combination of the outer error detection code and the encrypted data in the upper tier of the multi-tier storage system.

17. The method of claim 16 further comprising reading the combination of the outer error detection code and the encrypted data from the upper tier of the multi-tier storage system, removing the outer error detection code, examining the encrypted data to determine if a section of the encrypted data matches a pad designation sequence used to determine that encrypted and compressed data contains compressed data and when the section of the encrypted data matches the pad designation sequence storing a false positive flag for the encrypted data.

18. The method of claim 15 wherein storing the compressed data comprises encrypting the compressed data to form encrypted and compressed data and storing the encrypted and compressed data.

19. The method of claim 18 further comprising reading the encrypted and compressed data from the upper tier of the multi-tier storage system, adding a pad to the encrypted and compressed data, and storing the combination of the pad and the encrypted and compressed data in the lower tier of the multi-tier storage system.

20. The method of claim 19 further comprising reading the encrypted and compressed data from the lower tier of the multi-tier storage system and using the pad to determine that the encrypted and compressed data is compressed.

* * * * *